United States Patent [19]

Kawaguchi

[11] Patent Number: 5,059,647

[45] Date of Patent: Oct. 22, 1991

[54] OLIGOMERIC SEMICARBAZIDE ADDITIVES FOR SPANDEX

[75] Inventor: Akitsugu Kawaguchi, Otsu, Japan

[73] Assignee: E. I. Du Pont de Nemours and Company, Wilmington, Del.

[21] Appl. No.: 414,411

[22] Filed: Sep. 29, 1989

[51] Int. Cl.$^5$ ............................................. C08K 5/3492
[52] U.S. Cl. ..................................... 524/100; 524/101; 524/191
[58] Field of Search ............... 524/191, 192, 100, 101, 524/342, 351; 264/34, 35, 37; 528/61, 64

[56] References Cited

U.S. PATENT DOCUMENTS

| | | | |
|---|---|---|---|
| 3,149,998 | 9/1964 | Thurmaier | 524/192 |
| 3,268,474 | 8/1966 | Hardy et al. | 524/100 |
| 3,399,167 | 8/1968 | Rosendahl et al. | 260/45.8 |
| 3,428,711 | 2/1969 | Hunt | 260/859 |
| 3,461,106 | 8/1969 | Oertel et al. | 528/61 |
| 3,546,173 | 12/1970 | Hunt | 260/62 |
| 3,553,290 | 1/1971 | Hunt | 260/859 |
| 3,555,115 | 1/1971 | Bottomleye et al. | 260/858 |
| 3,640,937 | 2/1972 | Thoma et al. | 564/37 |
| 3,711,443 | 1/1973 | Thoma et al. | 564/35 |
| 4,499,221 | 2/1985 | Saitoh et al. | 524/109 |
| 4,619,956 | 10/1986 | Susi | 524/87 |

FOREIGN PATENT DOCUMENTS 56-11948 2/1981 Japan .
480091 12/1969 Switzerland .

OTHER PUBLICATIONS

Research Disclosure, No. 14428, "Improved Elastomeric Yarn" (Apr. 10, 1976).

Primary Examiner—Veronica P. Hoke

[57] ABSTRACT

A spandex fiber is provided with discoloration resistance by a synergistic combination of a hydroxyphenyl-1,3,5-triazine ultraviolet light absorber and N,N-dialkyl-semicarbazide groups, the groups being attached to the ends of the spandex polymer or as a substituent of an additive.

8 Claims, No Drawings

OLIGOMERIC SEMICARBAZIDE ADDITIVES FOR SPANDEX

BACKGROUND OF THE INVENTION

1. Field of the Invention

This invention relates to spandex fibers that contain, for protection against discoloration by atmospheric fumes and light, a combination of N,N-dialkylsemicarbazide groups and an ultraviolet light absorber. More particularly, the invention concerns such a fiber wherein (a) the semicarbazide groups are substituents on an additive to the fiber or are end groups of the spandex polymer and (b) the light absorber is a hydroxyphenyl-1,3,5-triazine.

2. Description of the Prior Art

Spandex fibers are usually protected against discoloration and degradation by a combination of additives. Such combinations may include phenolic antioxidants, tertiary amine stabilizers, semicarbazides, pigments and the like.

Spandex fibers, especially those having polyether soft segments, usually are stabilized by phenolic antioxidants. A frequently used phenolic antioxidant, is "Cyanox" 1790, made by American Cyanamid. Susi, U.S. Pat. No. 4,619,956, discloses such antioxidants. Other frequently used phenolic stabilizers are polymeric phenols, such as those disclosed by Hunt, U.S. Pat. Nos. 3,553,290 and 3,546,173. Spandex fibers often, also contain a polymeric tertiary amine as a secondary stabilizer to further protect the spandex against discoloration and/or degradation, as well as to provide the spandex polymer with sites for acid dyes. Such polymeric amines are disclosed by Hunt, U.S. Pat. No. 3,428,711 or Bottomley and Hunt U.S. Pat. No. 3,555,115.

The stability of spandex can be improved by adding semicarbazide groups, either in the form of end groups on the spandex polymer chains, as disclosed in Research Disclosure 14428 of Apr. 10, 1976, or as an N,N-dialkylsemicarbazide additive, as disclosed by Rosendahl et al, U.S. Pat. No. 3,399,167, and by Saitoh et al, U.S. Pat. No. 4,499,221. Japanese Patent Application Publication 11948-81 discloses use of a combination of N,N-dialkylsemicarbazides and specific phenolic antioxidants and benztriazole-type ultraviolet light absorbers for stabilizing polyurethanes.

Swiss Patent 480,091 to Ciba discloses hydroxyphenyl-1,3,5-triazines as ultraviolet light stabilizers for a wide variety of polymers, including polyurethanes.

Thus, phenolic antioxidants, semicarbazide stabilizers and various ultraviolet light stabilizers are each known to help protect polyurethane polymer against discoloration and degradation. The phenolics and semicarbazides reduce discoloration of spandex exposed to combustion fumes, or to combinations of nitric oxides and ultraviolet light (referred to as "UV light"), as are often encountered in urban environments. The light stabilizers, on the other hand, generally are not known to prevent discoloration by fumes or nitric oxides. Light stabilizers usually are not of much importance in spandex polymers because the usually-used phenolic antioxidants, in themselves, provide very good protection against UV light. Also, light stabilization usually can be further enhanced by the presence of semicarbazides and/or by adding a pigment, such as titanium dioxide. Yet, with such additive combinations, spandex fibers still discolor more than "hard" (i.e., non-elastomeric) fibers, such as nylon when exposed to atmospheres containing combustion fumes or nitric oxide, especially in the presence of ultraviolet light. Also, benzotriazole light stabilizers and hindered amine stabilizers, which are generally useful in many polymers, do not improve the resistance of spandex fibers to discoloration in combustion fumes and atmospheres that contain nitrogen oxides. Sometimes, commonly used benzotriazole and hindered amine stabilizers cause undesirable side effects, such as discoloration of the spandex in water containing traces of copper, or degradation in chlorinated water.

Although the known stabilizers and many combinations thereof have been useful in improving the discoloration resistance of spandex polymers in the past, further improvements in the spandex stabilization would significantly enhance the utility of the spandex fibers, yarns and fabrics. A purpose of this invention is to provide such a stabilization improvement.

SUMMARY OF THE INVENTION

The present invention provides a spandex fiber which is protected against discoloration that is caused by exposure to atmospheric fumes and light. The protection is provided by a combination of effective amounts of N,N-dialkylsemicarbazide groups and a hydroxyphenyl-1,3,5-triazine light absorber. The semicarbazide groups can be spandex polymer end groups or substituents on an additive. The effective amount of semicarbazide groups usually is in the range of 10 to 60 milliequivalents per kilogram of spandex fiber, preferably 15 to 35 meq/kg. The effective amount of the hydroxyphenyl triazine is in the range 0.2 to 2 percent based on the weight of the polymer, preferably in the range of 0.5 to 1.0%. The alkyl groups of the dialkylsemicarbazide are preferably methyl or ethyl groups or are the carbon-to-carbon segments of a piperidine ring and the triazine is preferably a 2,4-di(2',4'-dimethylphenyl)-6-(2"-hydroxy-4"-alkoxyphenyl)-1,3,5-triazine. Usually, the alkoxy group contains 1 to 12 carbon atoms. Most preferably, the alkoxyphenyl group is an n-octyloxyphenyl group. The combination of the N,N-dialkylsemicarbazides and the hydroxyphenyl-1,3,5-triazine provides spandex, especially polyether-based spandex, with unexpectedly strong, synergistic protection against discoloration by atmospheric fumes and light.

DETAILED DESCRIPTION OF PREFERRED EMBODIMENTS

As used herein, the term "spandex" has its usual definition; that is, a long chain synthetic polymer that comprises at least 85% by weight segmented polyurethane. The terms "soft segment" and "hard segment" refer to specific portions of the spandex chain. In the present invention, the soft segments are the portions of the spandex chain that are derived from poly(tetramethylene-ether)glycol (referred to as "PO4G") and the hard segments are the portions of the polymer chain that are derived from the reaction of isocyanates and a diamine chain extender. The isocyanate end group content of a pre-polymer (i.e., a isocyanate-terminated PO4G intermediate) may be referred to as the NCO content. "Molecular weight" means number average molecular weight. "Fiber" includes in its meaning staple fibers and continuous filaments.

For convenience, in the discussion and examples which are presented hereinafter, the following trade names and abbreviations are used for the accompanying listed chemical:

"Cyasorb-1164": 2,4-di(2',4'-dimethylphenyl)-6-(2"-hydroxy-4"-n-octyloxyphenyl)-1,3,5-triazine, a UV light stabilizer, sold by American Cyanamid.

UDMH: unsymmetrical, 1,1-dimethylhydrazine

DMAc: N,N-dimethylacetamide solvent.

PO4G: poly(tetramethylene ether) glycol.

MDI: methylene-bis(4-phenylisocyanate), also named p,p'-methylene diphenyl diisocyanate.

PICM: 4,4'-methylene-bis(cyclohexylisocyanate), also named bis(4-isocyanato-cyclohexyl)methane.

DIPAM/DM: A copolymer of diisopropylaminoethyl methacrylate and n-decyl methacrylate in a 75:25 weight ratio.

TBDEA: t-butyldiethanolamine.

"Cyanox-1790": 1,3,5-tris(4-t-butyl-3-hydroxy-2,6-dimethylbenzyl)-1,3,5-triazine-2,4,6 (1H,3H,5H)trione, an antioxidant, sold by American Cyanamid.

$TiO_2$: rutile titanium dioxide pigment.

UMB: ultramarine blue pigment, sold by Reckitts, Ltd., North Humberside, England.

"Duponol EP": A detergent, consisting mainly of diethanolamine lauryl sulfate, sold by E. I. du Pont de Nemours and Company.

According to the present invention, spandex fibers, especially those having polyether soft segments, are protected against discoloration by a combination of effective amounts of N,N-dialkylsemicarbazide groups and a hydroxyphenyl-1,3,5-triazine light stabilizer. The addition of the triazine light stabilizers to the spandex fibers containing semicarbazide groups, not only provides a marked increase in whiteness retention to the fibers when the fibers are exposed to ultraviolet light, but also when the fibers are exposed to combustion fumes or other atmospheres containing nitrogen oxides, with or without ultraviolet light. Apparently, a synergism occurs between the semicarbazide groups and the triazine, whether the semicarbazide groups are attached to an additive or to ends of the spandex polymer chains.

In preferred embodiments of the invention, a polyether-based spandex fiber contains a combination of effective amounts of a hydroxyphenyl-1,3,5-triazine and N,N-dialkylsemicarbazide groups along with a phenolic antioxidant additive. The spandex fibers of the invention may also optionally contain other conventional agents for specific purposes such as additional antioxidants, polymeric tertiary amines, thermal stabilizers, zinc oxide for chlorine resistance, pigments, dye enhancers, lubricating agents and the like.

Effective concentrations of the hydroxyphenyl-1,3,5-triazines for use in the present invention are in the range of 0.2 to 2.0%, based on the weight of the spandex fiber (without finish). Preferred concentrations are in the range of 0.5 to 1.0%.

Preferred hydroxyphenyl-1,3,5-triazines are 2,4-di(2',4'-dimethylphenyl)-6-(2"-hydroxy-4"-alkoxyphenyl)-1,3,5-triazines, in which the alkoxy group substituent has 1 to 12 carbon atoms. Most preferably, the alkoxyphenyl group is an n-octyloxyphenyl group.

Effective concentrations of the N,N-dialkylsemicarbazide groups usually are in the range of 10 to 60 milliequivalents per kilogram of spandex fiber (without finish). Preferably, the concentration of N,N-dialkylsemicarbazide groups is in the range of 15 to 35 meq/kg. Concentrations of greater than than 60 meq/kg may be useful, but usually are limited by the number of end groups available in the polymer, or by the maximum amount of additive that can be used without detrimentally affecting physical properties of the fiber.

The alkyl groups of the N,N-dialkylsemicarbazide groups of the present invention are preferably methyl or ethyl groups or the like. The carbon-to-carbon segments of a piperidine ring also are suitable for the N,N-dialkyl portion of the semicarbazide. N,N-dimethylsemicarbazide groups are preferred.

When the semicarbazide groups are to be present as end groups of the spandex polymer, the semicarbazide groups preferably are formed by reacting an N,N-dialkylhydrazine, such as unsymmetrical dimethylhydrazine, with isocyanate-terminated pre-polymer. This ensures complete reaction of the dialkylhydrazine before the spandex polymer is produced by chain-extension with faster-reacting diamines.

When the semicarbazide groups are to be present in the form of oligomeric semicarbazides, the oligomer is preferably made by reacting an isocyanate-terminated pre-polymer completely with a 1,1-dialkylhydrazine by adding up to the stoichiometric amount of the hydrazine before adding any other chain terminators.

The reactions forming semicarbazide groups can be carried out in the presence of solvent, preferably the same solvent as is used in forming a solution of the spandex polymer prior to the spinning of the polymer solution into spandex fibers. The oligomeric semicarbazides can be added as a solution or a slurry, along with the other optional stabilizers and additives, to spandex spinning solution. The resulting solutions can be dry-spun through spinnerets into spandex fibers by conventional well-known techniques.

The following test procedures are used for measuring discoloration and degradation of spandex fibers and for showing the synergistic effect of the ingredients combination of the invention. Discoloration of test samples is determined as a change in "b" value (i.e., "$\Delta b$"), which is measured by means of a differential colorimeter (e.g., a model D-25-3 Differential Colorimeter manufactured by Hunter Associates Laboratory, Inc., Reston, Va.) which has been calibrated against the manufacturer's standard reference plates. For these measurements, yarn test samples are wound under low tension on an aluminum plate that measures 7.6 by 10.7 by 0.16 centimeters, to form a layer of about 3-millimeter thickness.

In summarizing the color changes experienced by various samples in the tests described in the examples below, $\Delta b$ values are normalized to those of a comparison sample of the same polymer, made in the same way and containing the same additives, but containing no N,N-dialkysemicarbazide groups and no hydroxyphenyl-1,3,5-triazine of the invention. The normalized value for the color change of such comparison samples is 1.00. Samples that are better protected, do not change color as much and have normalized $\Delta b$ values that are considerably smaller than 1.00.

Various exposure tests are reported in the examples. Exposure-to-combustion-fumes tests are conducted in accordance with Test Method 23-1962 of AATCC (American Association of Textile Chemists and Colorists). An atmospheric fume chamber Model 6528 made by United States Testing Company, Inc. of Hoboken, N.J., is employed. For exposures to nitrogen oxide with or without ultraviolet light, a Scott Controlled Atmosphere tester is used, into which air containing 1000 ppm (part per million) of nitrogen dioxide is introduced at a rate of 3 liters per minute. Light is supplied to the tester from by eight "daylight" and four "black" fluorescent tubes (e.g., type F30T8 and FTO38BL manufactured by General Electric Co.). A fan mixes and circulates the gases in the test chamber. For exposure to UV light, tests are conducted in the presence of water, in an Atlas Series C "Weather-ometer", made by Atlas Electric Devices Co. of Chicago, Ill. In the Weather-ometer, samples are exposed to a xenon light having a spectrum resembling that of sunlight.

Degradation in UV light is also determined by measuring the "growth" experienced by spandex fiber samples that are exposed to UV light while being held in a stretched condition. The growth, or increase in length after release from the stretch, is a result of plastic flow, which occurs more rapidly when the polymer degrades during the light exposure. In this test, the fibers are mounted with 50% elongation on open frames and then exposed to UV light in a "Weather-ometer". After the exposure, the stretch is released, the fibers are allowed to relax for 15 minutes, and the increase in fiber length is measured. The growth is reported as a percent of the applied stretch.

The concentration of semicarbazide groups is recorded in the examples in milliequivalents per kilogram of spandex fiber. The concentration is calculated from the amount of dialkylhydrazine that is added during preparation of the spandex polymer or additive.

The amount of hydroxyphenyl-1,3,5-triazine in the spandex fiber can be determined by extracting the triazine from the fiber with a chlorinated solvent and then determining the amount of triazine in the extract by nuclear-magnetic-resonance analysis versus standard triazine solutions.

The invention is further illustrated by the following examples of preferred embodiments. These examples are included for the purposes of illustration and are not intended to limit the scope of the invention, which scope is defined by the appended claims. The results reported in these examples are believed to be representative, but do not constitute all the runs involving the indicated ingredients. Unless otherwise specified, all percentages are by total weight of the fibers (without finish). Note that samples labeled with an Arabic numeral correspond to the example number and are of the invention. Samples labeled with upper case letters (e.g., A, B, ... H, I) are comparison samples and are outside the scope of the invention.

EXAMPLE 1

A first solution of segmented polyurethane/urea (referred to as "Polymer Solution I") was prepared in accordance with the general procedure described in Hunt, U.S. Pat. No. 3,428,711. An intimate mixture of MDI and PO4G of 1800 molecular weight in a molar ratio of 1.63 was maintained at 80° to 90° C. for 90–100 minutes to yield an isocyanate-terminated polyether-urethane (also called "capped glycol"). The capped glycol was cooled to 60° C. and mixed with DMAc to provide a mixture containing about 45% solids. Then, under vigorous mixing, the capped glycol was reacted for 2 to 3 minutes at a temperature of about 75° C. with a DMAc solution containing a 90/10 molar ratio mixture of ethylene diamine and 1,3-cyclohexylene diamine chain-extenders and a diethylamine chain-terminator. The resulting solution of segmented polyurethane urea contained approximately 37% solids and had a viscosity of approximately 2500 poises at 40° C.

A second solution of segmented polyurethane/urea with semicarbazide end groups (referred to as "Polymer Solution II") was prepared in a similar manner to Polymer Solution I, except that the molecular weight of the PO4G was 2100, the capping ratio 1.7, and the DMAc used for diluting the capped glycol contained UDMH to give 20 meq/kg semicarbazide end groups based on final solids content of the spinning solution; also, the chain-extender was a 70/30 molar mixture of ethylene diamine and 2-methyl-1,5-pentamethylene diamine.

To viscous Polymer Solutions I and II were added a phenolic antioxidant which was the reaction product of p-cresol and divinylbenzene, a hydroxyl-terminated copolymer of TBDEA and PICM, and a silicone oil, to give 1.2, 2.0 and 0.6% concentrations, respectively, based on the solids of the resulting solutions. In addition, solutions were prepared from each of the polymers A and B which contained in addition to the phenolic, amine and silicone additives, a triazine light stabilizer, "Cyasorb" 1164 at a concentration of 0.8% based on solids. The solutions were dry-spun in conventional manner through orifices to form coalesced, 4-filament, 44-dtex yarns. For discoloration measurements, the yarns wound on cards were given a simulated finishing treatment by immersing the cards for one hour at atmospheric pressure in 85°–96° water containing 1.5 g/l each of tetrasodium pyrophosphate and "Duponol" EP detergent and 0.37 g/l ethylene diamine tetraacetic acid.

Table 1 below summarizes the results of various exposure tests. Discoloration "Δb" values were measured for samples exposed for 20 hours to combustion fumes or a combination of NO2 and UV light. The Δb data are given in the table, along with normalized discoloration values (i.e., normalized to the "Δb" values measured for samples made with solution A without light stabilizer (i.e., for spinning samples having no semicarbazide groups or UV stabilizer in the spandex). Table 1 also summarizes the results of a 20-hour UV growth test. Results were normalized to Comparison Sample A which contained no semicarbazide groups and no triazine light absorber.

As clearly shown by the data of Table 1, the combination of semicarbazide groups and "Cyasorb" 1164, in accordance with the present invention, results in strongly synergistic effects. The combination of both ingredients was much superior in preventing excessive growth, discoloration and degradation, than one would have expected from measurements in the same tests on yarns which contained only one or the other of the ingredients of the combination. Use of the combination, resulted in much greater improvements than would have been expected from the sum of the improvements provided by each ingredient when used alone.

TABLE 1

| Sample | 1 | A | B | C |
|---|---|---|---|---|
| Concentrations | | | | |
| Semicarbazide, meq/kg | 20 | 0 | 0 | 20 |
| "Cyasorb-1164", % | 0.8 | 0 | 0.8 | 0 |
| Discoloration Tests | | | | |
| Fumes | | | | |
| Δb | 3.0 | 10.8 | 12.1 | 6.7 |
| Normalized | 0.27 | 1.00 | 1.13 | 0.62 |
| NO2 + UV | | | | |
| Δb | 4.0 | 12.8 | 12.4 | 6.5 |
| Normalized | 0.31 | 1.00 | 0.96 | 0.50 |
| UV light | | | | |
| Δb | 1.3 | 11.5 | 3.0 | 8.4 |

TABLE 1-continued

| Sample | 1 | A | B | C |
|---|---|---|---|---|
| Normalized Growth in UV light | 0.12 | 1.00 | 0.26 | 0.73 |
| % length increase | 13.1 | 30.7 | 18.0 | 27.2 |
| Normalized | 0.43 | 1.00 | 0.59 | 0.89 |

EXAMPLE 2

An oligomeric semicarbazide additive was prepared as follows: A mixture of 333 grams of PO4G of 1000 molecular weight ("Terathane" 1000 made by E. I. du Pont de Nemours and Company) and 219 grams of PICM to which 20 microliters dibutyl tin dilaurate catalyst had been added was heated one hour at 75° C. to give an isocyanate-terminated pre-polymer containing 7.65% NCO. Free PICM contained in the prepolymer was removed by continuous liquid-liquid extraction with hexane, until the pre-polymer, after solvent removal, showed 3.63% NCO. The extracted prepolymer was then reacted with a solution of the theoretical amount of UDMH in DMAc, to give a 50% solution of an oligomeric semicarbazide containing 0.414 meq semicarbazide per gram of solution.

Polymer Solution I of Example 1 was mixed with a slurry of TiO2, ZnO and UMB, "Cyanox" 1790 antioxidant, DIPAM/DM copolymer and silicone oil in DMAc to give 4.1, 1.3, 0.01, 1.5, 2.0 and 0.6% concentrations based on total solids of the resulting solution. This solution was then split into four parts, to which the following additional ingredients were added:

Sample D—None
Sample E—"Cyasorb" 1164 amounting to 0.8% by weight of the fiber
Sample F—Oligomeric semicarbazide amounting to 18 meq/kg semicarbazide in fiber
Sample 2—0.8% "Cyasorb" 1164 plus 18 meq/kg of oligomeric semicarbazide Yarns were spun as in Example 1, wound on cards and subjected to simulated finishing treatments, except that in addition to the aqueous, boil-off sets of yarns were also finished to simulate solvent scouring by immersing the cards in tetrachloroethylene for 1.5-2.0 minutes at 45° C., air-drying overnight, and boiling the yarn off in water acidified with acetic acid to pH 5.

The discoloration and growth tests of this example were of longer duration than those of Example 1. The yarns of this example contained, among other things, pigments, which provided some additional stabilization against discoloration, thereby requiring longer exposure periods before for significant yellowing occurred. The discoloration results recorded below in Table 2 are in the form of normalized Δb values, normalized to Comparison Sample D, which contained no semicarbazides and no hydroxyphenyl-1,3,5-triazine. The reported values are averages for the changes in "b-values" (i.e., Δb) experienced by the spandex fibers in (a) 20, 40 and 60 hour fume exposure tests, (b) 20, 40 and 60 hour NO2-+UV exposure tests, and (c) 20, 40, 60 and 80 hour UV-light exposure tests. The UV-light growth tests were of 60 hour duration. The results of the two simulated finishing treatments were also averaged. containing 1.85% NCO. The pre-polymer solution was cooled to 0° C. and a solution of 36.0 grams of UDMH in 100 grams of DMAc was added drop-wise followed by an addition of 0.08 gram of ethylene diamine. The resultant 50% solution of the desired oligomeric semicarbazide/tertiary amine additive was allowed to warm for four hours to room temperature.

A portion of the additive solution described in the preceding paragraph was mixed with a slurry of DIPAM/DM, rutile TiO2, ZnO, ultramarine blue pigment, "Cyanox-1790" and silicone oil in DMAc and added to Polymer Solution I of Example 1. As a result, the polymer solution contained concentrations of 2.0% DIPAM/DM, 4.1% TiO2, 1.3% ZnO, 0.01% UMB, 1.5% "Cyanox-1790" and 0.6% silicone oil, based on the weight of total solids in the polymer solution. This polymer solution was then split into four parts, to which additional ingredients were added to form the following samples:

Sample G—None
Sample H—0.8% "Cyasorb" 1164
Sample I—Oligomeric semicarbazide/t-amine to provide 18 meq/kg semicarbazide groups in the spandex fiber
Sample 3—0.8% "Cyasorb" 1164 plus 18 meq/kg of semicarbazide groups in the form of oligomeric semicarbazide/t-amine Yarns were spun as in Example 1, wound on cards and subjected to simulated finishing treatments. The yarns were then exposed to discoloration tests, as in Example 2. Test results are summarized in Table 3, below.

As in Examples 1 and 2, the results summarized in Table 3, demonstrated that spandex polymer containing a combination of semicarbazide groups and "Cyasorb" 1164 in accordance with the invention, discolored much less than

TABLE 2

| Sample | 2 | D | E | F |
|---|---|---|---|---|
| Concentrations | | | | |
| Semicarbazide, meq/kg | 18 | 0 | 0 | 18 |
| "Cyasorb-1164", % | 0.8 | 0 | 0.8 | 0 |
| Discoloration Tests | | | | |
| Normalized Δb Values | | | | |
| Fumes | 0.74 | 1.00 | 1.05 | 0.89 |
| NO2 + UV | 0.58 | 1.00 | 0.97 | 0.72 |
| UV light | 0.53 | 1.00 | 0.80 | 0.78 |
| Growth in UV light | | | | |
| % length increase | 32 | 59 | 51 | 42 |
| Normalized | 0.54 | 1.00 | 0.86 | 0.71 |

As in Example 1, discoloration of spandex polymer containing a combination of semicarbazide groups and "Cyasorb" 1164 was much less than expected on the basis of the effect of the separate stabilizers. The combination in accordance with the invention exhibited a highly advantageous synergistic effect in reducing discoloration. The synergism was also effective in reducing UV-induced growth.

EXAMPLE 3

In this example an oligomeric semicarbazide/tertiary amine additive is prepared and used in spandex fiber in combination with a hydroxyphenyl triazine in accordance with the invention to show the synergistic superiority of the stabilizer combination of the invention over comparison samples which contained individual components of the combination but not combined.

A 50% additive solution of an oligomer of a semicarbazide and tertiary amine was prepared as follows. A mixture of 471.9 grams of PICM, 241.8 grams of TBDEA and 650 grams of DMAc were heated at 100° C. for 6 hours to form a solution of an isocyanate-terminated pre-polymer would have been expected on the basis of the discolorations measured in the exposure tests of samples containing the separate stabilizers. Also, the combination of semicarbazide groups and "Cyasorb-164" in accordance with the invention, synergistically decreased UV-induced growth.

TABLE 3

| Sample | 3 | G | H | I |
|---|---|---|---|---|
| Concentrations | | | | |
| Semicarbazide, meq/kg | 18 | 0 | 0 | 18 |
| "Cyasorb-1164", % | 0.8 | 0 | 0.8 | 0 |
| Discoloration Tests | | | | |
| Normalized Δb Values | | | | |
| Fumes | 0.70 | 1.00 | 1.05 | 0.84 |
| NO₂ + UV | 0.42 | 1.00 | 0.95 | 0.54 |
| UV light | 0.59 | 1.00 | 0.79 | 1.01 |
| Growth in UV light (20 hr) | | | | |
| % length increase | 15 | 23 | 19 | 20 |
| Normalized | 0.65 | 1.00 | 0.83 | 0.87 |

I claim:

1. A polyether-based spandex fiber containing, for protection against discoloration by atmospheric fumes and light, a synergistic combination of N,N-dialkylsemicarbazide groups and a hydroxyphenyl-1,3,5-triazine light absorber, the semicarbazide groups being present as spandex polymer end groups or as substituents on an additive in a concentration range of 10 to 60 milleequivalents per kilogram of spandex fiber and the light absorber being present in a concentration range of 0.2 to 2 percent based on the weight of the spandex fiber and being 2,4-di(2',4'-dimethylphenyl)-6-(2''-hydroxy-4''-alkoxyphenyl)-1,3,5-triazine, the alkoxy group having 1 to 12 carbon atoms.

2. A spandex fiber of claim 1 wherein the semicarbazide groups amount to 15 to 35 meq/kg and the hydroxyphenyl triazine amounts to 0.5 to 1.0%.

3. A spandex fiber of claim 1 or 2 wherein the alkyl groups of the N,N-dialkylsemicarbazide groups are methyl groups and the alkoxyphenyl group of the triazine light absorber is an n-octyloxyphenyl group.

4. A spandex fiber of any of claims 1 and 2 wherein the fiber contains a phenolic antioxidant and optionally further contains titanium dioxide, zinc oxide, and ultramarine blue.

5. A spandex fiber of claim 4 wherein the phenolic antioxidant is 1,3,5-tris(4-t-butyl-3-hydroxy-2,6-dimethylbenzyl)-1,3,5-triazine-2,4,6(1H,3H,5H)trione.

6. A spandex fiber of claim 4 wherein the fiber additionally contains a copolymer of diisopropylaminoethyl methacrylate and n-decyl methacrylate.

7. A spandex fiber of claim 4 wherein the phenolic antioxidant is a reaction product of p-cresol and divinyl benzene.

8. A spandex fiber of claim 7 wherein the fiber additionally contains a hydroxyl-terminated copolymer of N-t-butyldiethanolamine and 4,4'-methylene-bis(cyclohexylisocyanate).

* * * * *

UNITED STATES PATENT AND TRADEMARK OFFICE
CERTIFICATE OF CORRECTION

PATENT NO. : 5,059,647

DATED : October 22, 1991

INVENTOR(S) : Akitsugu Kawaguchi

It is certified that error appears in the above-identified patent and that said Letters Patent is hereby corrected as shown below: In Column 9, line 1, after "pre-polymer" insert:

containing 1.85% NCO. The pre-polymer solution was cooled to 0°C and a solution of 36.0 grams of UDMH in 100 grams of DMAc was added drop-wise followed by an addition of 0.08 gram of ethylene diamine. The resultant 50% solution of the desired oligomeric semicarbazide/tertiary amine additive was allowed to warm for four hours to room temperature.

A portion of the additive solution described in the preceding paragraph was mixed with a slurry of DIPAM/DM, rutile $TiO_2$, ZnO, ultramarine blue pigment, "Cyanox-1790" and silicone oil in DMAc and added to Polymer Solution I of Example 1. As a result, the polymer solution contained concentrations of 2.0% DIPAM/DM, 4.1% $TiO_2$, 1.3% ZnO, 0.01% UMB, 1.5% "Cyanox-1790" and 0.6% silicone oil, based on the weight of total solids in the polymer solution. This polymer solution was then split into four parts, to which additional ingredients were added to form the following samples:

Sample G - None
Sample H - 0.8% "Cyasorb" 1164
Sample I - Oligomeric semicarbazide/t-amine to
           provide 18 meq/kg semicarbazide
           groups in the spandex fiber
Sample 3 - 0.8% "Cyasorb" 1164 plus 18 meg/kg
           of semicarbazide groups in the form
           of oligomeric semicarbazide/t-amine

UNITED STATES PATENT AND TRADEMARK OFFICE
CERTIFICATE OF CORRECTION

PATENT NO. : 5,059,647
DATED : October 22, 1991
INVENTOR(S) : Akitsugu Kawaguchi It is certified that error appears in the above-identified patent and that said Letters Patent is hereby corrected as shown below:

Yarns were spun as in Example 1, wound on cards and subjected to simulated finishing treatments. The yarns were then exposed to discoloration tests, as in Example 2. Test results are summarized in Table 3, below.
    As in Examples 1 and 2, the results summarized in Table 3, demonstrated that spandex polymer containing a combination of semicarbazide groups and "Cyasorb" 1164 in accordance with the invention, discolored much less than Signed and Sealed this Twenty-first Day of December, 1993

Attest:

BRUCE LEHMAN

Attesting Officer      Commissioner of Patents and Trademarks